(12) United States Patent
Beveridge (10) Patent No.: US 11,194,786 B2
(45) Date of Patent: Dec. 7, 2021

(54) RECONCILING CONFLICTS BETWEEN REPLICAS OF TREE-STRUCTURED DATA

(71) Applicant: Google LLC, Mountain View, CA (US)

(72) Inventor: James E. Beveridge, San Jose, CA (US)

(73) Assignee: Google LLC, Mountain View, CA (US)

( * ) Notice: Subject to any disclaimer, the term of this patent is extended or adjusted under 35 U.S.C. 154(b) by 98 days.

(21) Appl. No.: 16/624,486

(22) PCT Filed: Oct. 20, 2017

(86) PCT No.: PCT/US2017/057524
§ 371 (c)(1),
(2) Date: Dec. 19, 2019

(87) PCT Pub. No.: WO2019/078876
PCT Pub. Date: Apr. 25, 2019

(65) Prior Publication Data
US 2020/0110738 A1    Apr. 9, 2020

(51) Int. Cl.
*G06F 16/23*     (2019.01)
*G06F 16/27*     (2019.01)
(52) U.S. Cl.
CPC .......... *G06F 16/2365* (2019.01); *G06F 16/27* (2019.01)
(58) Field of Classification Search
CPC ..... G06F 16/2365; G06F 16/27; G06F 16/273
USPC ........................................................ 707/691
See application file for complete search history.

(56) References Cited

U.S. PATENT DOCUMENTS

| 6,457,065 | B1* | 9/2002 | Rich | G06F 9/466 |
| | | | | 719/328 |
| 6,848,078 | B1* | 1/2005 | Birsan | G06F 16/904 |
| | | | | 715/206 |
| 2006/0242444 | A1 | 10/2006 | Novik et al. | |
| 2008/0010587 | A1 | 1/2008 | Wake et al. | |
| 2010/0106687 | A1 | 4/2010 | Marcy et al. | |

(Continued)

FOREIGN PATENT DOCUMENTS

WO    WO 2016/196693    12/2016

OTHER PUBLICATIONS

PCT International Preliminary Report on Patentability in International Application No. PCT/US2017/057524, dated Nov. 19, 2019, 9 pages.

(Continued)

*Primary Examiner* — Michael Pham
(74) *Attorney, Agent, or Firm* — Fish & Richardson P.C.

(57) ABSTRACT

The subject matter of this specification generally relates to reconciling conflicts between replicas of data. In one aspect, a system obtains a first document that includes a first replica of an object used by an application at a first device and a second document that includes a second replica of the object used by the application at a second device. The system generates a merged document from the first document and the second document. The system determines that the first value for the first key was modified at the first device at a later time than the first value for the first key was modified at the second device. In response, the system includes, in the merged document, the first value for the first key in the first document and, for each descendant element of the first element, a value for the descendant element's key in the first document.

20 Claims, 6 Drawing Sheets

(56) References Cited

U.S. PATENT DOCUMENTS

2011/0066626 A1   3/2011   Dharmalingam
2014/0259005 A1   9/2014   Jeffery et al.
2015/0341176 A1   11/2015  Staykov et al.
2017/0024451 A1   1/2017   Sullivan

OTHER PUBLICATIONS

PCT International Search Report and Written Opinion in International Application No. PCT/US2017/057524, dated Feb. 8, 2018, 15 pages.
PCT Written Opinion of the International Preliminary Examining Authority in International Application No. OCT/US2017/057524, dated Sep. 2, 2019, 8 pages.
Office Action in European Appln. No. 17793806.5, dated Aug. 11, 2021, 9 pages.

* cited by examiner

RECONCILING CONFLICTS BETWEEN REPLICAS OF TREE-STRUCTURED DATA

BACKGROUND

This specification describes technologies for reconciling inconsistent replicas of data items, such as tree-structured data items. These technologies generally involve generating a merged replica that predictably resolves the inconsistency between the replicas.

For example, multiple replicas of the same data can be modified at different computing devices, resulting in inconsistent data between the multiple devices. The multiple replicas can be merged to create a consistent set of data. However, there may be conflicts between the multiple replicas that need to be resolved during the merging process. For example, the same element may have been changed to multiple different values at the different computing devices and/or an element may have been added to, or removed from a replica at one of the devices. To generate a consistent set of data at all of the devices, a determination must be made as to which of the multiple different values is included in the merged data set and/or whether to add or remove an element that was added or removed at one of the devices.

SUMMARY

This specification describes systems, methods, devices, and techniques for reconciling conflicts between replicas of data. A conflict between replicas of data occurs when two data elements have different values for the same keys. An object can include multiple data elements, with each data element having a respective key-value pair. When synchronized, each replica has the same value for the same key and the same set of keys. For example, replica A and replica B can include a key-value pair using key J. When synchronized, both replica A and replica B will have the same value for the key J. If the value of key J in replica A is different from the value of key J in replica B or is missing from replica A, there is a conflict between replica A and replica B.

In general, one innovative aspect of the subject matter described in this specification can be implemented in a system that includes a data processing apparatus and a memory apparatus in data communication with the data processing apparatus. The memory apparatus stores instructions executable by the data processing apparatus and that upon such execution cause the data processing apparatus to perform operations including obtaining a first document that includes a first replica of a first hierarchical representation of an object used by an application at a first device. The first hierarchical representation of the object can include multiple elements. Each element can include a key-value pair. The first hierarchical representation of the object can include a first timestamp for a first key of a first element that indicates a time at which a first value for the first key was modified at the first device. The first element can include one or more descendant elements in the first hierarchical representation. The data processing apparatus obtains a second document that includes a second replica of a second hierarchical representation of the object used by the application at a second device different from the first device. The data processing apparatus generates a merged document from the first document and the second document. The merged document can include a current value of each key-value pair in object. Generating the merged document can include determining, based at least on the first timestamp for the first key, that the first value for the first key was modified at the first device at a later time than the first value for the first key was modified at the second device. In response to determining that the first value for the first key was modified at the first device at a later time than the first value for the first key was modified at the second device, the data processing apparatus can include, for the first key, the first value for the first key in the first document rather than the first value for the first key in the second document and, for each descendant element of the first element, a value for the descendant element's key in the first document rather than a value for the descendant element's key in the second document. Other implementations of this aspect include corresponding apparatus, methods, and computer programs, configured to perform the actions of the methods, encoded on computer storage devices.

These and other implementations can optionally include one or more of the following features. In some aspects, the second hierarchical representation includes a second timestamp that indicates a time at which the first value for the first key was modified at the second device. Determining, based at least on the first timestamp, that the first value for the first key was modified at the first device at a later time than the first value for the first key was modified at the second device can include determining that the time indicated by the first timestamp is later than the time indicated by the second timestamp.

In some aspects, the second hierarchical representation does not include a second timestamp for the first object. Determining, based at least on the first timestamp, that the first value for the first key was modified at the first device at a later time than the first value for the first key was modified at the second device can include determining that the first value for the first key has not been modified at the second device since a last merge of the first document with the second document.

In some aspects, the first hierarchical representation includes a second timestamp that indicates a time at which a second value for a second key of a second element of the multiple elements was modified at the first device. The second element can include a second descendant element. The first hierarchical representation can also include a third timestamp that indicates a time at which a third value for a third key of the second descendant element was modified at the first device. The second hierarchical representation can include a fourth timestamp that indicates a time at which the second value for the second key was modified at the second device and a fifth timestamp that indicates a time at which the third value for the third key was modified at the second device. The operations can include determining that the time indicated by the second timestamp matches the time indicated by the fourth timestamp and, in response, comparing the third timestamp to the fifth timestamp and, determining, based on the comparing, that the third value for the third key was modified at the second device at a later time than the third value for the third key was modified at the first device. In response to determining that the third value for the third key was modified at the second device at a later time than the third value for the third key was modified at the first device, the data processing apparatus can include, in the merged document, the third value for the third key in the second document rather than the third value for the third key in the first document.

In some aspects, the first hierarchical representation is a text-based representation. The text-based representation can be JavaScript Object Notation (JSON). The first hierarchical representation can include a first sibling key for the first key, wherein the timestamp for the first key is a value for the first sibling key. The operations can include determining, by the first device, that a value of a first descendant element's key has been changed at the first device and, in response to determining that the value of the first descendant element's key has been changed at the first device, creating, in the first document, a second sibling key for the first descendant element's key, the second sibling key including a value based on a timestamp that indicates a time at which the value of the first descendant element's key was changed and is located, in the first document, directly below the first descendant element's key.

In some aspects, a value of the descendant element in the first document is included in the merged document rather than a value of the descendant element in the second document irrespective of whether the descendant element was modified at the second device at a later time than the descendant element was modified at the first device.

Particular embodiments of the subject matter described in this specification can be implemented so as to realize one or more of the following advantages. Replicas of an object can be merged such that changes to each element of the object are commutative and are guaranteed to converge. For example, by maintaining timestamps at the root of the change (e.g., for the actual key whose value has changed) rather than at the highest level of a tree or sub-tree or at every key in the tree or sub-tree, the intent of the change is unambiguous and the change becomes commutative. Merging replicas as described herein is also idempotent, meaning that two replicas can be merged more than once without changing the results.

By storing timestamps as tagged data for modified keys, the shape of the tree can remain the same, allowing the merging techniques described herein to be retrofitted to existing implementations. The tagged data that includes the timestamps can include sibling keys (e.g., using tildes as described below). The timestamps can also be stored as separate metadata, such as a map of JSON pointers to timestamps.

When a higher level element that has descendant elements has been changed in one replica at a later time than the higher level element was changed in a different replica, the value of the descendant elements in the one replica can be included in the merged document irrespective of the times at which the descendant elements were changed in the two replicas. In this way, the timestamps of the descendant elements may not be evaluated at all, resulting in increased speeds at which a computing device can merge replicas, fewer computing resources needed to merge the replicas, and/or an increase in the number of replicas merged by the computing device over a given time period.

Various features and advantages of the foregoing subject matter is described below with respect to the figures. Additional features and advantages are apparent from the subject matter described herein and the claims.

DESCRIPTION OF DRAWINGS

Like reference numbers and designations in the various drawings indicate like elements.

DETAILED DESCRIPTION

In general, systems and techniques described herein merge replicas of data such that conflicts between the replicas are reconciled. The act of merging two replicas results in a merged replica that deterministically reconciles the conflicts between the replicas.

A replica is a copy of an object having one or more data elements. Replicas of the same data can be concurrently modified at multiple different computing devices. For example, a user may update a calendar application using multiple different devices. To maintain consistent data, the updates at one computing device can be merged with the data at each other computing device. In this way, each computing device has the same data for the application.

Each replica of data can be represented using a hierarchical structure, e.g., a tree structure. The data can include elements that each include a value. Some elements can include descendant elements that are at a lower hierarchical level than the element. For example, an object for a calendar application can include an element for each month and, for each month, a respective descendant element for each day of the month. In addition, the element for each day can include a descendant element for each hour.

An electronic document, which for brevity will simply be referred to as a document, can be used to store one or more replicas and their respective values. When the value of an element is modified at a computing device, the computing device can record a timestamp in the document that indicates the time at which the element was modified. The timestamp can be recorded in the document with the element at the root of the change, e.g., rather than the top of a tree of sub-tree in which the element is a descendant element or at every key in the sub-tree. The timestamps can then be used to merge multiple replicas.

The system can merge replicas of an object (or other set of data) to generate a merged document that includes the reconciled values of each element of the object. In some implementations, the system merges two replicas of an object at a time although there may be more than two replicas of the object. When merging replicas of an object, the system can resolve conflicts between values of the replicas based on the hierarchical structure and the timestamps for the elements. In some implementations, the system can evaluate elements higher in the hierarchy before evaluating elements lower in the hierarchy. If an element at a particular level in the hierarchy for a first replica has a timestamp that indicates that it was modified at a later time than the same element in a second replica, the system can include, in the merged document, the value of the element in the first replica.

If the element has descendant elements, the system can also include, in the merged document, the value of the descendant elements in the first replica rather than the value of the descendant elements in the second replica. The system can use the values of the descendant elements in the first replica even if the descendant elements were modified later in the second replica than in the first replica. In some implementations, when the system identifies an element that was modified at a later time in one replica than another replica, the values of the descendant elements of the element from the first replica are included in the merged document without evaluating the timestamps of the descendant elements in either replica.

If an element that has descendant elements has the same timestamp in two replicas, the system can evaluate timestamps of the descendant elements to determine which values to include in the merged document. The system can move down one level in the hierarchy at a time until the system identifies a descendant element that was modified at one replica at a later time than at another replica or at which an element was deleted from one of the replicas. The system can include, in the merged document, the value of the descendant element in the replica in which the descendant element was modified last. If the element was deleted from one of the replicas, the system can evaluate the timestamp for the element in the two replicas. If the element was deleted from a first replica after the last modification of the element in a second replica, the element (and any descendant elements of the element), the system can remove (or not include) the element in the merged document. If the element was modified at the second replica at a later time than the element was deleted from the first replica, the merged document can include the value of the modified element and the value of any descendant elements from the first replica.

Figure 1:
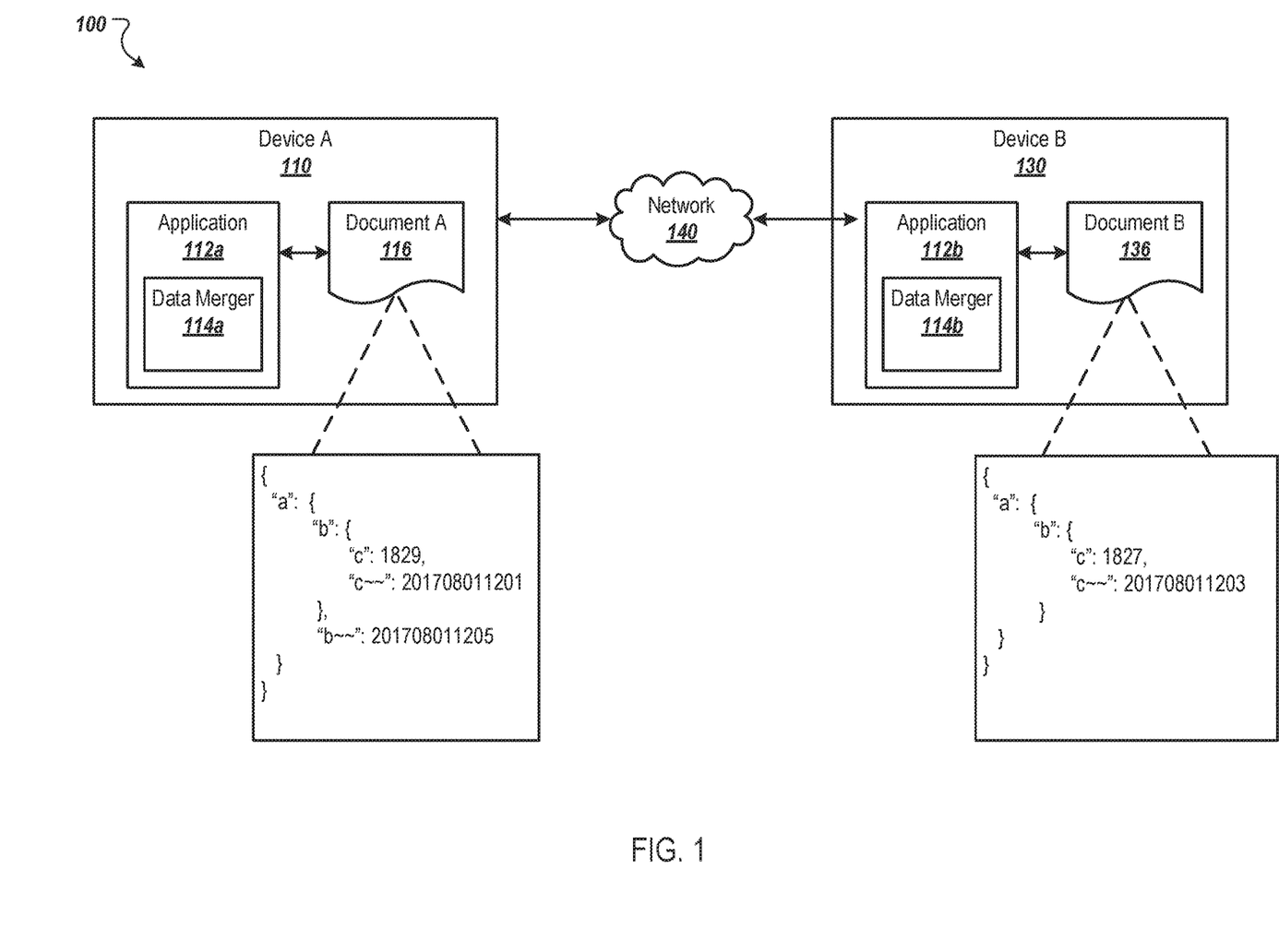
FIG. 1 is an example environment in which computing devices merge replicas of an object.

FIG. 1 is an example environment 100 in which computing devices 110 and 130 merge replicas of an object. The computing devices 110 and 130 can be laptop computers, desktop computers, smartphones, tablet computer, wearable devices, smart televisions, or any other appropriate devices that can be used to view, interact with, or modify electronic data. The computing devices 110 and 130 can communicate over a data communication network 140, e.g., a local area network (LAN), a wide area network (WAN), a mobile network, the Internet, Wi-Fi, Bluetooth, or a combination thereof.

Each computing device 110 and 130 includes one or more applications, including an application 112 which is executed by both computing devices 110 and 130. Each of the applications 112a-b are associated with an object that can be used by the applications 112a-b and/or modified by the applications 112a-b at each computing device 110 and 130.

In some implementations, the set of data is stored in the form of an object. For example, the set of data can be stored in the form of a JavaScript Object Notation (JSON) object that is maintained in a JSON document, JSON is a general-purpose data-interchange format that can used to store and transmit data for applications, such as the applications 112a-b. A JSON object includes one or more elements that each include a respective key-value pair (also sometimes referred to as name-value pairs) that can be arranged in a hierarchical structure, e.g., in a JSON tree. A key-value pair includes a key that represents a data item and a value for the data item. In some implementations, the set of data is stored in other formats, such as Extensible Markup Language (XML) or YAML Ain't Markup Language (YAML).

The applications 112a-b can store a replica of the data at each computing device 110 and 130 that executes the application 112a-b. In a JSON implementation, each replica can be stored in a respective JSON document. Similarly, in implementations that use XML or YAML, each replica can be stored in a respective XML or YAML document. For example, the applications 112a can store a replica of the data for the device 110 in document A 116 and the application 112b can store a replica of the data for the device 130 in document B 136.

Although FIG. 1 illustrates two computing devices 110 and 130 that each store a respective replica of the data for the application 112a-b, other numbers of computing devices can each store a replica of the data for the application. Similarly, although each computing device 110 and 130 is illustrated as storing a single replica of the data for the application 112a-b, a single computing device can store multiple replicas.

Each document 116 and 136 can include elements that each include a respective key-value pair for the application 112a-b. For example, document A 116 includes a key-value pair with a key of "c" and a value of 1829, Similarly, document B 136 includes the key-value pair with a key of "c" and a value of 182". The documents 116 and 136 also include elements with keys "a" and "b" for which the key "c" is a descendant element.

In a tree structure, a descendant element for a particular element is an element that is connected to the particular element and that is at a lower the hierarchy level in the tree than the particular element. Descendant elements include child elements, grandchild element, great-grandchild elements, and so on. In this example, the element with the key "c" is a descendant element of the element with the key "a" and the element with the key "b", and the element with the key "b" is a descendant element of the element with the key "a". For example, the key "a" may be a data item for a top-level data element (e.g., a person's data), the key "b" may be a data item for a subset of data about the person (e.g., address data), and the key "c" may be a data item for specific address data (e.g., street number).

When the application 112a-b modifies the value of an element, the application 112a-b can record, in the document on the computing device at which the modification occurred, a timestamp that indicates the time at which the modification occurred. The timestamp can be recorded as text in the document, e.g., rather than metadata of the document. For example, the timestamp can be recorded as the value of a key-value pair or as an element in the document. In a particular example, when the application 112a running on computing device 110 modified the value of the key "c" to a value of 1829, the application 112 recorded a timestamp of "201708011201" in the document 116. This timestamp is encoded to reference a date of Aug. 1, 2017 and a time of 12:01 pm. Similarly, when the application 112b running on computing device 130 modified the value of the key "c" to a value of 1827, the application recorded a timestamp of "201708011203" in the document 136. This timestamp is encoded to reference a date of Aug. 1, 2017 and a time of 12:03 pm. The document 116 also includes a timestamp of "201708011205" for the key "b" indicating that the value of the key "b" was modified at 12:05 pm on Aug. 1, 2017 to have a value of 2.

In some implementations, each timestamp includes a nonce value that is randomly generated. The nonce can be added to the end of each timestamp to break ties between two otherwise equal timestamps. For example, the format of a timestamp may be yyyymmddhhmmssmsnonce, where "yyyy" represents the year, "mm" represents the month, "dd" represents the day, "hh" represents the hour, "mm" represents the minute, "ss" represents the second, "ms" represents the millisecond, and "nonce" represents the random nonce value. The nonce value can be random, but guaranteed to increase monotonically over time on a particular replica so that a later timestamp on the same replica is assigned a higher value nonce than an earlier timestamp.

The applications 112a-b can record the timestamp for the element whose value was modified, e.g., as the base of the modification. For example, when the value of the key "c" was modified, the timestamp was recorded for the key "c" rather than an element higher in the hierarchy, e.g., rather than for the key "b" and/or for the key "a". In this way, a data merger 114 (described below) can identify which key was modified at the time indicated by the timestamp. If the timestamp was recorded for the key "a" to indicate that the value of "a" was modified based on the descendant element with key "c" being modified, then the timestamp would be ambiguous and may cause modifications to descendant elements in another replica to be erroneously overwritten during merging, as described below.

The timestamps can be included in the documents 116 and 136 in such a way that the shape of the hierarchical structure (e.g., a tree structure) is not changed. This allows for the timestamps to be included in the documents without retrofitting an existing implementation to parse the data in the hierarchical representation. In some implementations, the timestamp for a key is recorded in the document as a sibling key. A sibling key for a particular key is a key that is as the same level in the hierarchy and that has the same parent. For example, the timestamp for the key "c" in the document is recorded as a value of the sibling key "c~~". The format of the sibling key can be in the form of "[key]~~" so that the data merger 114 can parse the sibling keys to identify the timestamps and the keys to which the timestamps belong.

In some implementations, the timestamp for a key is recorded as metadata separate from the document. For example, the timestamps for a key can be recorded as a JSON pointer to the timestamp, e.g., in a map of JSON pointers to timestamps. As metadata is part of XML file formats, when the replicas are stored in XML documents, the timestamps can be stored as metadata attributes of the XML tags.

The value of a key may be set using a set function, such as "json_object→Set({"a", "b", "c"}, 1829);". In this example, the value of the key "c" is being set to 1829 and the set function includes the path to the key "c" including each key of the ancestor elements of the key "c". When the applications 112a-b execute a set function of this form, the applications 112a-b can record the time at which the set function was executed as a timestamp for the key "c" at the end of the path as the value of the "key" is the value being modified by the set function.

In some implementations, an element and all of its parents may not have timestamps. For example, each element can be assigned a zero timestamp that has a value of zero with no random nonce. When the value of the element is modified, the implicit zero timestamp can be replaced with a timestamp that has a value that indicates the time at which the value of the element was modified and optionally a random nonce that can be used to break ties between timestamps. For the purpose of this document, an element that has a zero timestamp is also referred to as an element that does not have a timestamp. The contents of two elements with a zero timestamp can be merged, not overwritten.

As the applications 112a-b can modify data at each computing device 110 and 130 concurrently, each of the applications 112a-b can include a data merger 114a-b that merges the data, e.g., periodically. For example, the computing device 130 may be offline (e.g., no connected to the network 140 for a period of time. A user may use the computing device 110 to interact with the application 112a and modify the application's data. When the computing device 130 reconnects to the network 140 (or directly to the computing device 110, the applications 112a-b at each computing device 110 and 130 can exchange documents 116 and 136. For example, the computing device 110 can transmit the document 116 to the computing device 130 and the computing device 130 can transmit the document 136 to the computing device 110.

The data merger 114a-b at one or both computing devices 110 and 130 can merge the two documents 116 and 136 to generate a merged document that includes the current values of the application's data. In some implementations, the data merger 114a-b generates the merged document using the local document. For example, the data merger 114a running on the computing device 110 can update the document 116 with values from the document 136. When the merging is complete, the document 116 is the merged document. The data merger 114b running on the computing device 130 can perform the same process to update the document 136 to be a merged document using the values of the document 116. Using the same merging techniques at both computing devices 110 and 130, the resulting merged documents include the same current values for the application 112.

The data mergers 114a-b can merge two documents at a time. For example, the data merger 114a can receive a document that includes a replica of the data from a different computing device, e.g., the document 136 from the computing device 130, and merge the document 116 with the document 136. The computing device from which the document was received does not affect the merging process. That is, the data merger 114a will generate the same merged document from the two document independent of the source of the other document.

The data merger 114a-b can merge the documents 116 and 136 based on the hierarchy of the elements in the documents and the times at which the values of the elements were changed at one or more of the computing devices 116 and 136. In general, the data merger 114a-b can evaluate the elements starting at the highest level in the hierarchy and, if appropriate, evaluate the elements lower in the hierarchy. For example, a tree structure can include multiple sub-trees each with an element at the highest level in the hierarchy and with one or more elements at lower levels in the sub-tree. The data merger 114a-b can for example recurse through the hierarchy by evaluating the elements at the highest level in the hierarchy, e.g., at the top of each sub-tree, and then evaluate the elements at lower levels in one or more of the sub-trees if appropriate.

In a recursive process for evaluating the elements, the data merger 114a-b evaluates the elements at the highest level in the hierarchy and, if appropriate, performs the evaluation on elements at lower levels in the hierarchy, e.g., moving one level lower into the hierarchy at a time. As described below, the data merger 114a-b can move to a lower level in the hierarchy if the timestamps of an element are the same in both replicas or neither replica includes a timestamp. The timestamps may be the same if the element has not been modified at either device after a previous merge or both timestamps are zero timestamps. Otherwise, a nonce value of the timestamps can be used to break the tie.

If the timestamps of the element indicate that the element was modified at a later time at one replica than at another replica, the values of the descendent elements from the later modified replica can be included in the merged document, e.g., without recursing through the descendant elements. Similarly, if the timestamps of an element indicate that the element was deleted from one of the replicas at a later time than the element was modified at a different replica, the element can be deleted from the merged document, e.g., without recursing through the descendant elements.

If an object includes multiple elements at the highest level in the hierarchy, the data merger 114a-b can recurse through the sub-tree of each element at the highest level separately. That is, the data mergers 114a-b can evaluate descendant elements in the sub-tree of a first element at the highest level in the hierarchy if timestamps for the first element at two or more replicas are equal or the replicas do not include timestamps for the first element. For a second element at the highest level in the hierarchy, the data merger 114a-b can determine to include, in the merged document, the values for the descendant elements included in one of the replicas if the timestamp for the second element in the one replica indicates that the second element was modified at a later time in the one replica than the other replicas without recursing through any of the descendant elements of the second element.

The data merger 114a-b can identify an element at the highest level in the hierarchy in one of the documents, e.g., the document 116, and attempt to identify the same element in the other document, e.g., the document 136. If both documents include the element, the data merger 114a-b can determine whether one or both of the documents include a timestamp for the element. If both documents include a timestamp for the element, e.g., as respective sibling elements for the element, the data merger 114a-b can determine which timestamp indicates a later time (e.g., the more recent time). The data merger 114a-b can then include, in the merged document, the value of the element from the document having the timestamp that indicates the later time.

If the element has descendant elements, the data merger 114a-b can also include, in the merged document, the value of each descendant element from the document having the timestamp that indicates the later time for the element, e.g., irrespective of any timestamps for the descendant elements. That is, if the top element in a sub-tree of the document 116 was modified at a later time than the top element in the same sub-tree in the document 136, the merged document can include the value of the top element from the document 116 and the value of each descendant element in the sub-tree from the document 116 even if the descendant elements in the document 136 were modified at a later time than the descendant elements in the document 116.

If a document, e.g., the document 116, does not include a timestamp for a highest level element (i.e., an element at the highest level in the hierarchy), the data merger 114a-b can determine that the element has not been modified at the computing device 110 at which the document 116 is maintained. In this example, if one document includes a timestamp for the element and the other document does not, the data merger 114a-b can determine that the element was modified at a later time at the computing device 110 that maintains the document that includes the timestamp. The data merger 114a-b can include, in the merged document, the value of the element from the document that includes the timestamp for the element. Similar to the above example, the data merger 114a-b can also include, in the merged document, the values of the descendant elements of the element from the document that includes the timestamp for the element.

For example, consider the element that includes the key "b" in the documents 116 and 136. The document 116 includes a timestamp for the key "b" as the value for the sibling key "b~~". The document 136 does not include a timestamp for the element that includes the key "b". In this example, the data merger 114a-b can determine that the value of key "b" was modified by the application 112a-b at the computing device 110 at a later time than the value of key "b" was last modified at the computing device 130. In response, the data merger 114a-b can include, in a merged document that represents a merging of the document 116 and the document 136, the value of the key "b" from the document 116. That is, the data merger 114a-b can include, in the merged document, the value of "2" for the key "b".

If neither document includes a timestamp for a highest level element or if the timestamps for the element are the same in both documents 116 and 136, the data merger 114a-b can recurse the element by evaluating descendant elements of the element. For example, if the top element of a sub-tree was not modified at either computing device following a previous merge, the data merger 114a-b can evaluate the descendant elements of the element to determine whether the value of any of the descendant elements were modified at one or both computing devices 110 and 130. The data merger 114a-b can determine which value to include in the merged document similar to the way in which the data merger 114a-b determined which value to include for the top element. For example, if the data merger 114a-b determines to include, in the merged document, the value for a descendant element in the document 116, the data merger 114a-b can also include, in the merged document, the value of any elements that are descendants of the descendant element from the document 116.

The data merger 114a-b can recurse the element's sub-tree by progressing one level at a time lower into a sub-tree until the data merger 115 identifies an element that was modified at a later time at one of the computing devices or reaches the lowest level in the sub-tree. If the data merger 114a-b reaches the lowest level and does not identify an element that was modified at a later time at one of the computing devices, the data merger 114a-b can include, in the merged document, the value of each element from either document. The data merger 114a-b can then move to the next sub-tree, if any, in the documents 116 and 136 and evaluate the elements in the next sub-tree in a similar manner.

If the data merger 114a-b identifies an element in one of the documents, e.g., the document 116, that includes a timestamp and the other document, e.g., the document 136, does not include the element, the data merger 114a-b can determine that the element represents a new data item and the element was added to the document 116 at the time indicated by the timestamp, but was not added to the document 136. The data merger can add the element to the merged document. However, the new element may be a descendant element of a particular element. In this example, if the document 136 has a timestamp for the particular element that is later than the timestamp for the particular element in the document 116, the data merger 114a-b may not evaluate the new element as the data merger 114a-b. For example, the data merger 114a-b can instead include, in the merged document, the value for the particular element from the document 136 and the value for the particular element's descendant elements from the document 136 without evaluating the descendant elements, as described above.

If the data merger 114a-b identifies a timestamp for a key in one of the documents, e.g., the document 116, but does not identify a key-value pair that includes a value for the key in the document 116, the data merger 114a-b can determine that the data item represented by the key was deleted by the application 114a running on the device 110. A deleted element can be treated the same as the other elements. For example, if the timestamp for the deleted element in the document 116 is later than the timestamp for the element in the document 136, the data merger 114a-b will consider the element deleted and not include the element in the merged document. If the timestamp for the deleted element in the document 116 is earlier than the timestamp for the element in the document 136, the data merger 114a-b can include, in the merged document, the value of the element from the document 136. However, just like the other elements, the deleted element may not be evaluated based on timestamps for any ancestor elements.

In some implementations, when merging two documents, the data merger 114a-b can automatically merge values of keys that do not have timestamps and that do not have any parents that have a timestamp. For example, JSON data often has keys at the root of the JSON tree that are important infrastructure for the tree. Within a particular application using the JSON data, the infrastructure keys always exist and it rarely makes sense to overwrite the infrastructure keys. Using timestamps for infrastructure keys can make it difficult to add new infrastructure keys as the application grows because the last computing device to perform the initialization will "win" and erase the initialization of other nodes. To allow such infrastructure keys to merge instead of overwriting, keys with no timestamps and no parents with timestamps will automatically be merged. That is, if a particular document is being updated to become the merged document, the infrastructure keys with no timestamps will keep the same values in the merged document.

Figure 2:
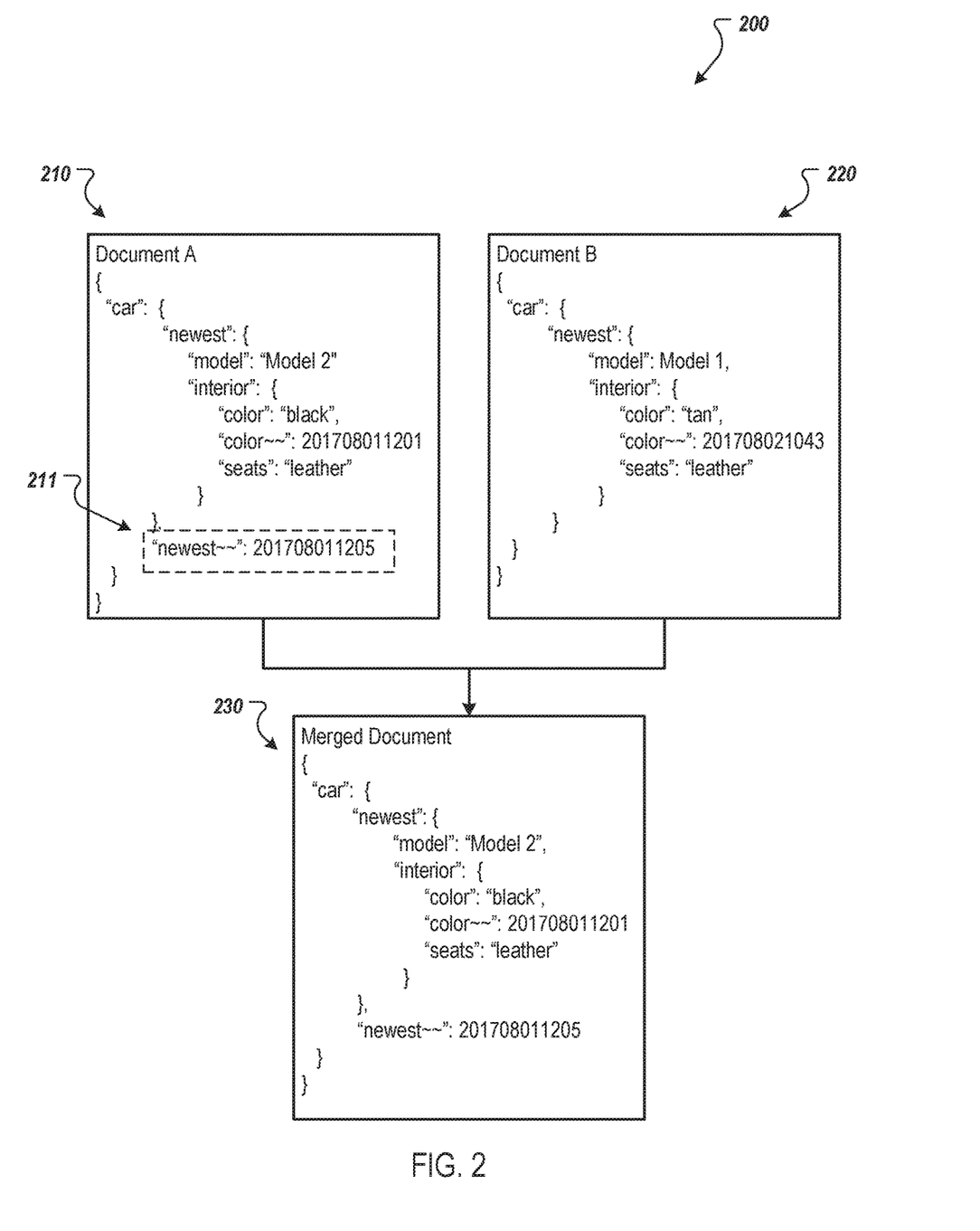
FIG. 2 depicts example documents that include replicas of an object being merged into a merged document.

FIG. 2 depicts example documents 210 and 220 that include replicas of a hierarchical representation of an object being merged into a merged document 230. The two documents 210 and 220 include data related to a car object. The document 210 includes an element with a "car" key that includes a descendant element with a key "newest". The element with the key "newest" includes a descendant element with a key "model" that has a value of "Model 2" and a descendant element with a key "interior". The descendant element with the key "interior", in turn, has descendant elements with a key "color" and a key "seats". The document 220 includes the same elements and keys as the document 210, but different values for some of the keys.

When the documents 210 and 220 are merged to generate the merged document 230, a data merger, e.g., the data merger 114a-b of FIG. 1, can evaluate the element with the key "car" first as this element is the highest in the hierarchical representation. In this example, the data merger would evaluate both documents 210 and 220 and determine that neither document includes a timestamp for the key "car". For example, neither document includes a sibling key for the key "car".

In response, the data merger can move to the next lower level that is below the element that includes the key "car". In this example, the data merger can evaluate the element that includes the key "newest" as it is the descendant element below the element with the key "car". The data merger can determine that the document 210 includes a timestamp 211 for the key "model" that indicates a time of 12:05 pm on Aug. 1, 2017. The data merger can also determine that the document 220 does not include a timestamp for the key "newest". Thus, the data merger can determine that the value for the key "newest" was modified at a later time at the computing device that maintains the document 210. In response, the data merger can include, in the merged document 230, the value for the key "newest" from the document 210.

The data merger can also include, in the merged document 230, the values for the descendant elements that are descendants of the element with the key "newest" from the document 210. That is, the data merger can include, in the merged document 230, the values for the keys "model", "interior", "color", and "seats" from the document 210. For example, the merged document 230 includes the value "Model 2" for the key "model, the value "black" for the key "color" and the value "leather" for the key "seats". The data merger can include, in the merged document 230, the values from the document 210 for the descendant keys without evaluating the descendant elements or their timestamps. For example, the timestamp for the key "color" in the document 220 indicates a later time (i.e., 10:43 am on Aug. 2, 2017) than the timestamp for the key "color" in the document 210 (i.e., 12:01 pm on Aug. 1, 2017). However, the data merger included, in the merged document 230, the value for the key "color" from the document 210 based on the higher level element with the key "model" being modified later for the document 210 than the document 220.

As shown in FIG. 2, the merged document 230 can include the timestamps from the document 210 from which the values were obtained. In this way, the merged document 230 can be merged with other documents, e.g., for other computing devices, or later with one of the documents 210 or 230.

After generating the merged document, the merged document can be used by the application on the device at which the merge was performed. A data merger of each device can perform the same merging process when the data merger receives a document with changes to a replica of the object.

Figure 3:
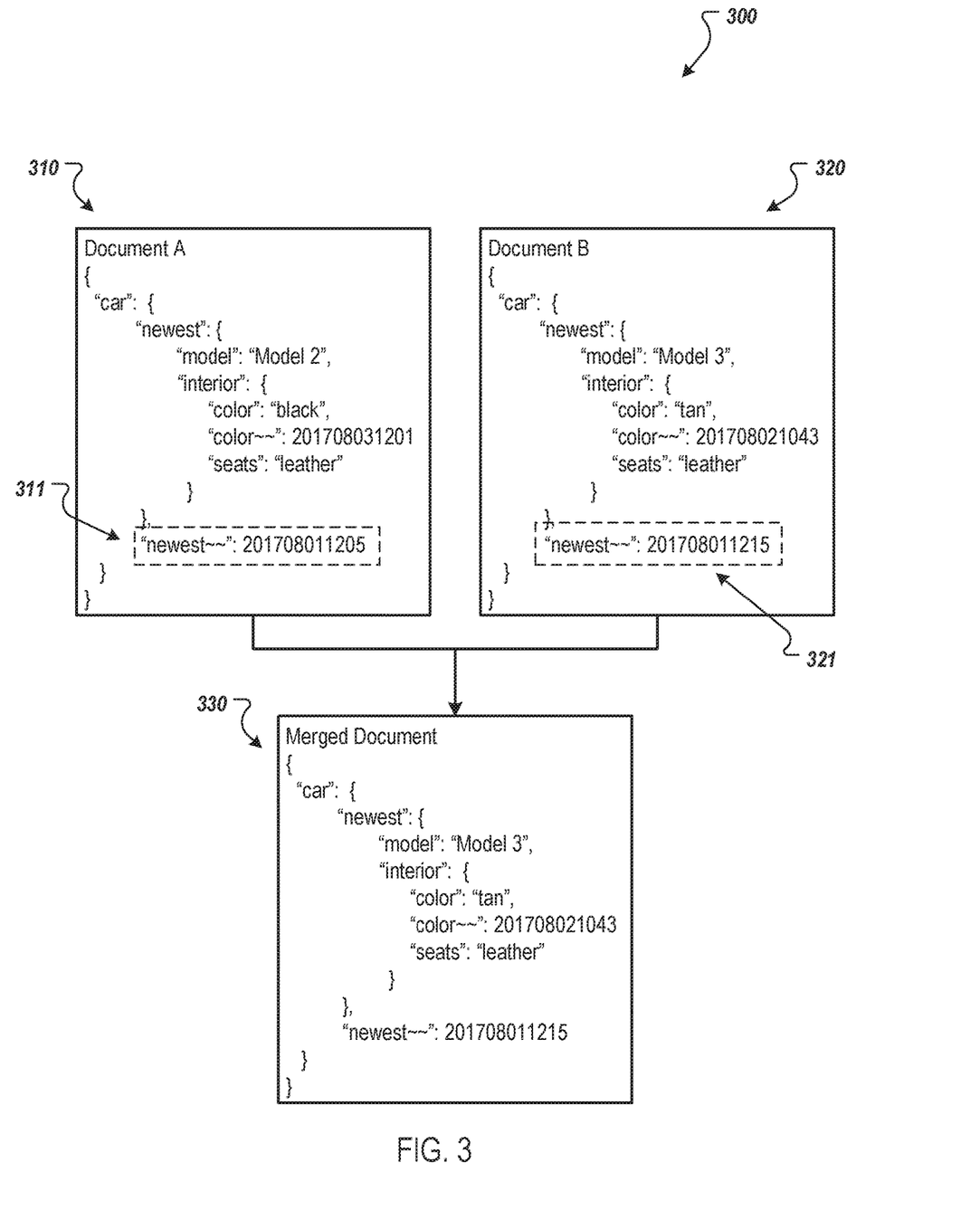
FIG. 3 depicts example documents that include replicas of an object being merged into a merged document.

FIG. 3 depicts example documents 310 and 320 that include replicas of a hierarchical representation of an object being merged into a merged document 330. Similar to the documents 210 and 220, the two documents 310 and 320 include data related to a car object. The document 310 includes an element with a "car" key that includes a descendant element with a key "newest". The data element with the key "newest" includes a descendant element with a key "model" and a descendant element with a key "interior" which, in turn, has descendant elements with a key "color" and a key "seats". The document 320 includes the same elements and keys as the document 310, but different values for some of the keys.

When the documents 310 and 320 are merged to generate the merged document 330, a data merger, e.g., the data mergers 114a-b of FIG. 1, can evaluate the element with the key "car" first as this element is the highest in the hierarchical representation. In this example, the data merger would evaluate both documents 310 and 320 and determine that neither document includes a timestamp for the key "car". For example, neither document includes a sibling key for the key "car".

In response, the data merger can move to the next lower level that is below the element that includes the key "car". In this example, the data merger can evaluate the element that includes the key "newest" as it is the descendant element below the element with the key "car". The data merger can determine that the document 310 includes a timestamp 311 for the key "newest" that indicates a time of 12:05 pm on Aug. 1, 2017. The data merger can also determine that the document 320 includes a timestamp 321 for the key "model" that indicates a time of 12:15 pm on Aug. 1, 2017. The data merger can determine, based on the timestamps 311 and 321, that the value for the key "newest" was modified later in the document 320 than in the document 310. In response, the data merger can include, in the merged document 330, the value for the key "newest" from the document 320.

The data merger can also include, in the merged document 330, the values for the descendant elements that are descendants of the element with the key "interior" from the document 320. That is, the data merger can include, in the merged document 330, the values for the keys "model", "interior", "color", and "seats" from the document 320. For example, the merged document 330 includes the value "Model 3" for the key "model", the value "tan" for the key "color" and the value "leather" for the key "seats". The data merger can include, in the merged document 330, the values from the document 320 for the descendant keys without evaluating the descendant elements or their timestamps. For example, the timestamp for the key "color" in the document 310 indicates a later time (i.e., 12:01 pm on Aug. 3, 2017) than the timestamp for the key "color" in the document 320 (i.e., 10:43 am on Aug. 2, 2017). However, the data merger included, in the merged document 330, the value for the key "color" from the document 320 based on the higher level element with the key "newest" being modified later for the document 320 than the document 310.

If the timestamps for the key "color" was assigned to each element in the path to the key "color", then the keys "car", "newest", and "interior" would all have the same timestamp. For example, in the document 310, the key "car" would have the timestamp "201708011201". Similarly, in the document 320, the key "car" would have the timestamp "201708011215". In this example, the merged document 330 would include all of the values from the document 310 as the timestamp for the key "car" in the document 310 would indicate a later time than the timestamp for the key "car" in the document 320. By including the timestamp only at the root of the change, the data merger can select the proper values from each document.

Figure 4:
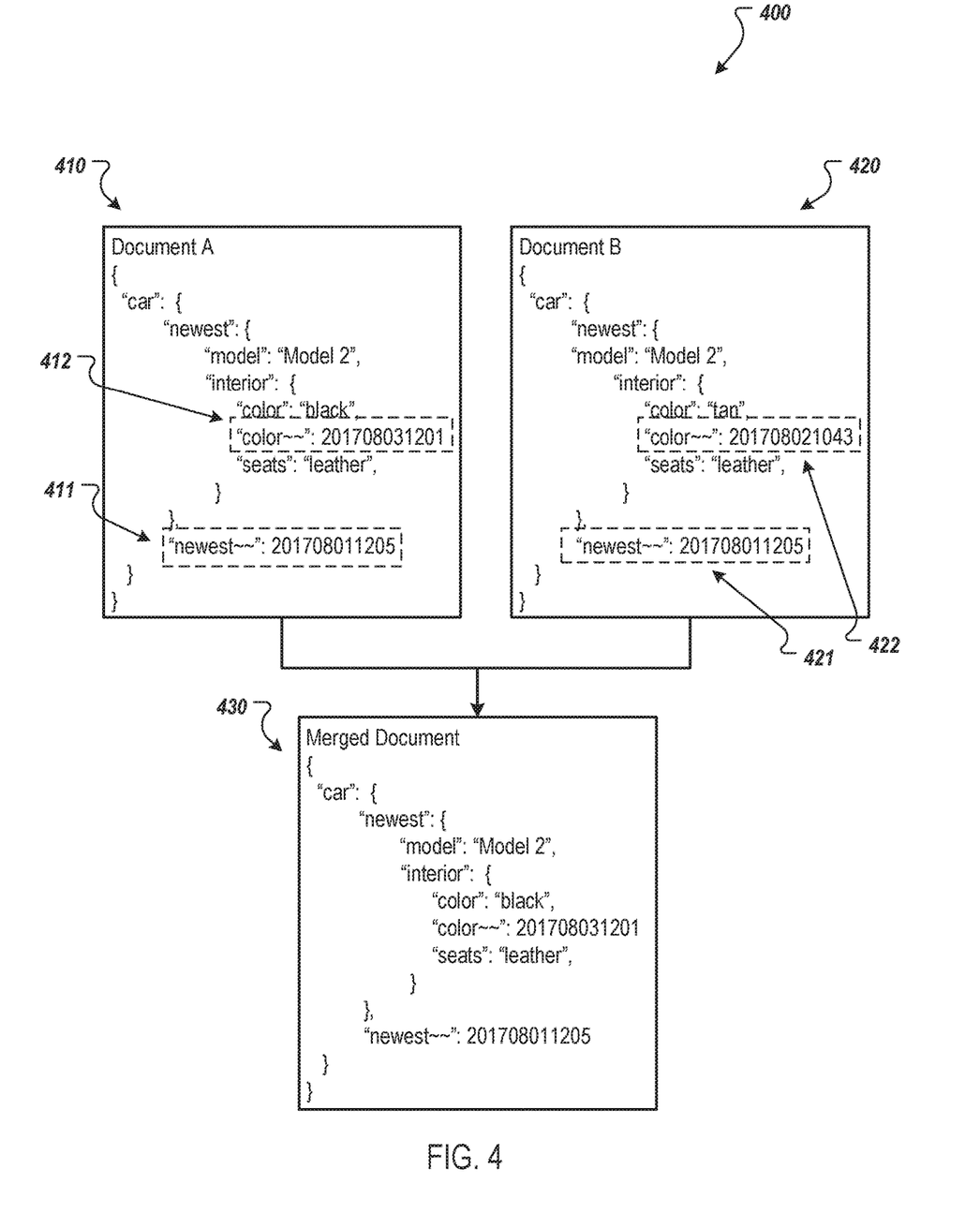
FIG. 4 depicts example documents that include replicas of an object being merged into a merged document.

FIG. 4 depicts example documents 410 and 420 that include replicas of a hierarchical representation of an object being merged into a merged document 430. Similar to the documents 210 and 220, the two documents 410 and 420 include data related to a car object. The document 410 includes an element with a "car" key that includes a descendant element with a key "newest". The data element with the key "newest" includes a descendant element with a key "model" and a descendant element with a key "interior" which, in turn, has descendant elements with a key "color" and a key "seats". The document 420 includes the same elements and keys as the document 410, but different values for some of the keys.

When the documents 410 and 420 are merged to generate the merged document 430, a data merger, e.g., the data mergers 114a-b of FIG. 1, can evaluate the element with the key "car" first as this element is the highest in the hierarchical representation. In this example, the data merger would evaluate both documents 410 and 420 and determine that neither document includes a timestamp for the key "car". For example, neither document includes a sibling key for the key "car".

In response, the data merger can move to the next lower level that is below the element that includes the key "car". In this example, the data merger can evaluate the element that includes the key "newest" as it is the descendant element below the element with the key "car". The data merger can determine that the document 410 includes a timestamp 411 for the key "newest" that indicates a time of 12:05 pm on Aug. 1, 2017. The data merger can also determine that the document 420 includes a timestamp 421 for the key "newest" that indicates a time of 12:05 pm on Aug. 1, 2017. The data merger can determine, based on the timestamps 411 and 421, that the value for the key "newest" was modified at the same time for both documents 410 and 420. In response, the data merger can evaluate elements lower in the hierarchical representation to determine which values to include in the merged document 430.

The data merger can move to the next lower element that includes the keys "model" and "interior". IAs there are multiple elements at this level, the data merger can evaluate each element at this level. The data merger can evaluate the element with the key "model" and determine that neither document 410 or 420 includes a timestamp for the keys "model". As the element with the key "model" does not include any descendant elements, the data merger can include, in the merged document 430, the value for the key "model" from either document as they have the same value. The data merger can move to the element with the key "interior".

The data merger can determine that neither document 410 or 420 includes a timestamp for the key "interior" but that the element with the key "interior" has descendant elements. As there are multiple elements at this level, the data merger can evaluate each element at this level.

The data merger can evaluate the element with the key "color" and determine that the document 410 includes a timestamp 412 that indicates a time of 12:01 pm on Aug. 3, 2017 for the key "color" and the document 420 indicates a timestamp 422 that indicates a time of 10:43 am on Aug. 2, 2017 for the key "color." The data merger can determine, based on the timestamps 412 and 422, that the value for the key "color" was modified later in the document 410 than in the document 410. In response, the data merger can include, in the merged document 430, the value for the key "color" from the document 410, namely the value "black".

The data merger can then evaluate the element with the key "seats" and determine that neither documents includes a timestamp for this key. The data merger can then include, in the merged document 430, the value for the key "seats" from either document as they have the same value.

Figure 5:
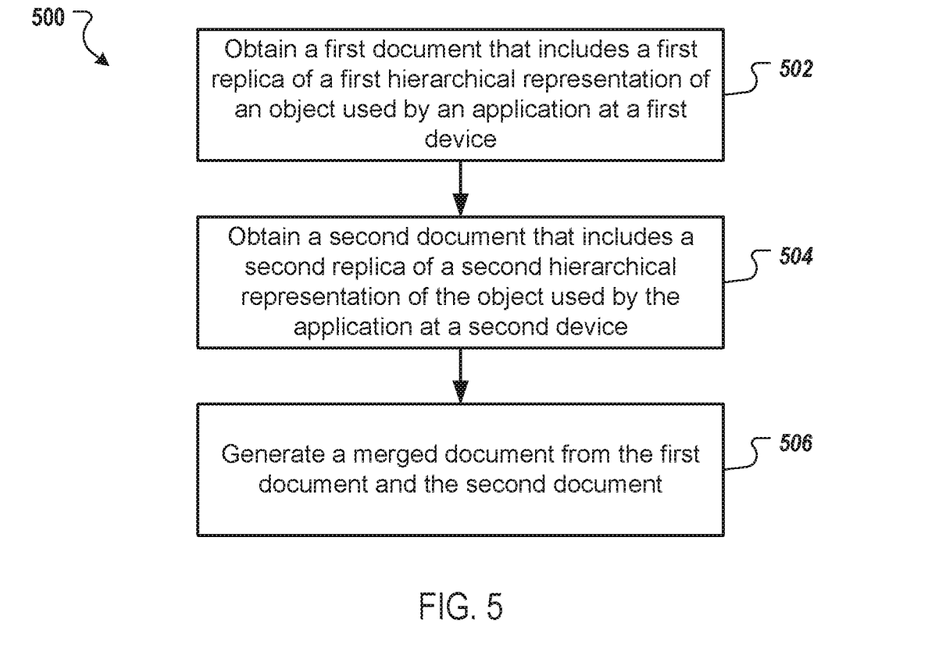
FIG. 5 is a flowchart of an example process for merging replicas of an object.

FIG. 5 is a flowchart of an example process 500 for merging replicas of an object. Operations of the process 500 can be implemented, for example, by a system that includes one or more data processing apparatus, such as the computing device 110 of FIG. 1 or the computing device 130 of FIG. 1. The process 500 can also be implemented by instructions stored on a computer storage medium where execution of the instructions by a system that includes a data processing apparatus cause the data processing apparatus to perform the operations of the process 500.

The system obtains a first document that includes a first replica of a first hierarchical representation of an object used by an application at a first device (502). The application can be installed on and/or executed by multiple different devices and modify replicas of the same data. For example, a user can use multiple different devices that execute the application to modify the user's data maintained by the application. In a particular example, a user can use multiple devices to modify the user's schedule in a calendar application.

The first document can be a JSON document that includes the replica of the object for the first device. In this example, the JSON document can include a first hierarchical representation of key-value pairs that define the object. In such a hierarchical representation, some elements can have descendant elements. For any key for which the value of the key was modified or deleted by the application at the first device, the JSON document can include a timestamp that indicates the time at which the key's value was modified or deleted.

The system obtains a second document that includes a second replica of a second hierarchical representation of the object used by the application at a second device (504). The second device can be different from the first device. For example, the first device can be a user's laptop computer and the second device can be the user's smartphone. The second document can also be a JSON document that includes the replica of the object for the second device. The JSON document can include a second hierarchical representation of key-pairs that define the object. In such a hierarchical representation, some elements can have descendant elements. For any key for which the value of the key was modified by the application at the second device, the JSON document can include a timestamp that indicates the time at which the key's value was modified.

The system generates a merged document from the first document and the second document (506). The merged document can include a current value for each element of the object. The merged document may also only include those elements that were not deleted at one of the replicas, e.g., at a later time than the elements were modified at the other replica. For example, if the documents are JSON documents, the merged document can include a current value for each key of the JSON object that has not been deleted and a timestamp for each key that was modified. For elements that have been deleted, the merged document can include a timestamp but no value for the element.

The system can merge the documents based on the hierarchy of the elements in the documents and the times at which the values of the elements were changed as indicated by the timestamps in the documents. For example, as described above, the system can start evaluating elements in the documents at the highest hierarchical level and work its way down into sub-trees if appropriate. If a particular highest level key in one of the documents has a later timestamp than the same key in the other document, the system can include, in the merged document, the value of the key from the document that includes the later timestamp. In addition, if there are descendant elements that descend from the element that includes the particular key, the system can include, in the merged document, the value of the descendant keys from the document that includes the later timestamp for the particular key. If a particular highest level key was deleted from one of the documents and has a later timestamp in the one document than the timestamp for the particular highest level key in the other document, the particular highest level key (and any descendants of the key) may not be included in the merged document.

If both documents have the same timestamp or no timestamp for an element at the highest level in the hierarchy and the element has one or more descendant elements, the system can evaluate the descendant elements in the same manner until the system identifies a descendant element that for which one of the documents includes a timestamp and the other document does not, or one of the documents includes a later timestamp for the descendant element than the other document. If the system finds a descendant element for which only one of the documents includes a timestamp, the system can include, in the merged document, the value for the key of the descendant element (and the values for the keys of any of its descendants) from the document that has the timestamp. Similarly, If the system finds a descendant element for which one of the documents has a later timestamp than the other document, the system can include, in the merged document, the value for the key of the descendant element (and the values for the keys of any of its descendants) from the document that has the later timestamp. If the system finds a key that was deleted from one of the documents and the document has a later timestamp for the key than the other document, the key (and any descendants of the key) may not be included in the merged document.

If the system reaches the lowest level in the sub-tree for the element without finding such a descendant element, the system can include, in the merged document, the data from one of the documents. For example, if the first device is merging the documents, the first device can include, in the merged document, the values for the key of the element and the value for the keys of its descendant elements from the first document. The system can evaluate each sub-tree in a similar manner until all sub-trees within the documents have been evaluates and the data merged into the merged document.

Figure 6:
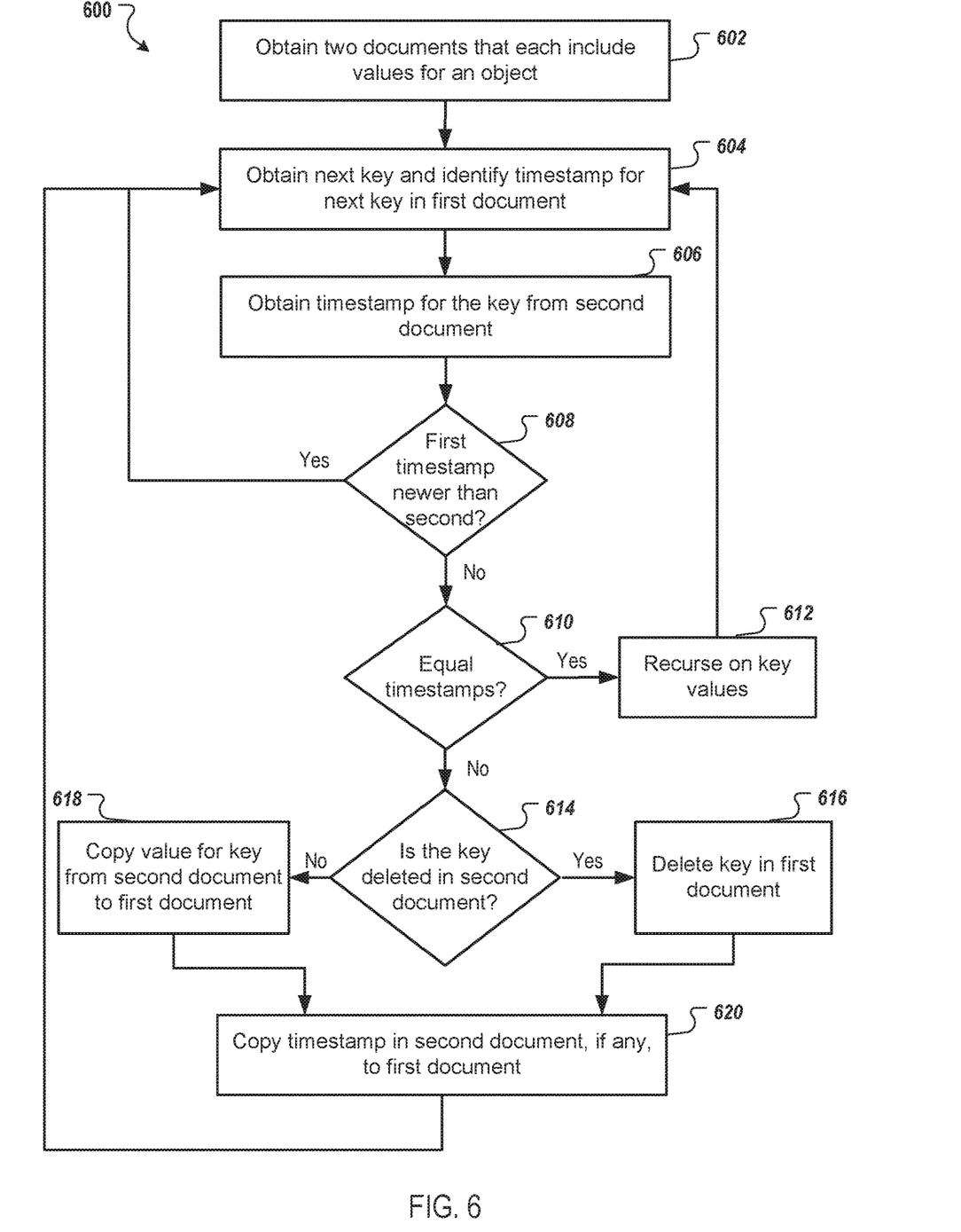
FIG. 6 is a flowchart of another example process for merging replicas of an object.

FIG. 6 is a flowchart of another example process 600 for merging replicas of an object. Operations of the process 600 can be implemented, for example, by a system that includes one or more data processing apparatus, such as the computing device 110 of FIG. 1 or the computing device 130 of FIG. 1. The process 600 can also be implemented by instructions stored on a computer storage medium where execution of the instructions by a system that includes a data processing apparatus cause the data processing apparatus to perform the operations of the process 600.

The process 600 is described in terms of generating a merged document by updating a first document with values from a second document such that the first document becomes the merged document. For example, a first device can maintain the first document that includes a first hierarchical representation of a first hierarchical representation of an object used by an application at a first device. The first device can receive, from a second device, a second document that includes a second replica of a second hierarchical representation of the object used by the application at the second device. The first device can then copy values of the second document into the first document, if appropriate, to generate a merged document.

The system obtains two documents that each include elements for an object (602). For example, the system may obtain the first document from the first device and the second document from the second device. The documents can be JSON documents with hierarchical representations of elements with key-value pairs.

The system obtains, as a key for evaluation, a next key and identifies a timestamp, if any, for the next key from the first document (604). In the first iteration, the next key can be a key at the highest level in the first hierarchical representation. In subsequent iterations, the next key may be at lower levels in the first hierarchical representation. The first document can include a timestamp for the key if the value for the key was modified at any device. For example, if the key was modified at a device different from the first device and the document from that device was merged with the first document, the first document can include the timestamp from the document from that device. The timestamp would indicate the time at which the modification occurred. The timestamp can be recorded in the first document using text, e.g., as the value of a sibling key for the next key.

The system obtains a timestamp, if any, for the key from the second document (608). The second document can include a timestamp for the key if the value for the key was modified at any device. The timestamp would indicate the time at which the modification occurred. The timestamp can be recorded in the second document using text, e.g., as the value of a sibling key for the key.

The system determines whether the timestamp obtained from the first document indicates a newer time than the timestamp obtained from the second document (608). If so, the system leaves the value of the element in the first document the same and returns to operation (604) to evaluate the key.

If not, the system determines whether the timestamp obtained from the first document indicates the same time as the timestamp obtained from the second document (610). If so, the system recurses on key values (612) and returns to operation (604). That is, the system moves to a descendant key of the key and evaluates the descendant key in operation (604).

If not, the system determines whether the key has been deleted from the second document (614). For example, the system can determine that the key was deleted from the second document if the second document does not include the key but does include a timestamp for the key, e.g., as the value of a sibling key for the key.

If the key has been deleted from the second document, the system deletes the key from the first document (616). If the key has not been deleted from the second document, the system copies the value of the key from the second document to the first document (618). For example, the system can overwrite the value of the key in the first document with the value of the key from the second document.

Whether the key was deleted from the second document or not, the system copies the timestamp for the key, if any, from the second document to the first document (620). The system then returns to operation (604) to evaluate the next key, if any.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for reconciling replicas of data, the system comprising:
   one or more processors; and
   a non-transitory computer storage medium in data communication with one or more processors and storing instructions executable by the one or more processors and that upon such execution cause the one or more processors to perform operations comprising:
      obtaining a first document that includes a first replica of a first hierarchical representation of an object used by an application at a first device, the first hierarchical representation of the object including a plurality of elements, each element comprising a key-value pair, the first hierarchical representation of the object including a first timestamp for a first key of a first element that indicates a time at which a first value for the first key was modified at the first device, the first element including one or more descendant elements in the first hierarchical representation;
      obtaining a second document that includes a second replica of a second hierarchical representation of the object used by the application at a second device different from the first device; and
      generating a merged document from the first document and the second document, the merged document including a current value of each key-value pair in the object, including:
         determining, based at least on the first timestamp for the first key, that the first value for the first key was modified at the first device at a later time than the first value for the first key was modified at the second device; and
         in response to determining that the first value for the first key was modified at the first device at a later time than the first value for the first key was modified at the second device, including, in the merged document:
            for the first key, the first value for the first key in the first document rather than the first value for the first key in the second document; and
            for each descendant element of the first element, a value for a key of the descendant element in the first document rather than a value for the key of the descendant element in the second document.

2. The system of claim 1, wherein:
   the second hierarchical representation includes a second timestamp that indicates a time at which the first value for the first key was modified at the second device; and
   determining, based at least on the first timestamp, that the first value for the first key was modified at the first device at a later time than the first value for the first key was modified at the second device comprises determining that the time indicated by the first timestamp is later than the time indicated by the second timestamp.

3. The system of claim 1, wherein:
the second hierarchical representation does not include a second timestamp for the first key; and
determining, based at least on the first timestamp, that the first value for the first key was modified at the first device at a later time than the first value for the first key was modified at the second device comprises determining that the first value for the first key has not been modified at the second device since a last merge of the first document with the second document.

4. The system of claim 1, wherein:
the first hierarchical representation includes:
 a second timestamp that indicates a time at which a second value for a second key of a second element of the plurality of elements was modified at the first device, the second element including a second descendant element; and
 a third timestamp that indicates a time at which a third value for a third key of the second descendant element was modified at the first device;
the second hierarchical representation includes:
 a fourth timestamp that indicates a time at which the second value for the second key was modified at the second device; and
 a fifth timestamp that indicates a time at which the third value for the third key was modified at the second device;
the operations further comprise:
 determining that the time indicated by the second timestamp matches the time indicated by the fourth timestamp and, in response:
  comparing the third timestamp to the fifth timestamp;
  determining, based on the comparing, that the third value for the third key was modified at the second device at a later time than the third value for the third key was modified at the first device; and
  in response to determining that the third value for the third key was modified at the second device at a later time than the third value for the third key was modified at the first device, including, in the merged document, the third value for the third key in the second document rather than the third value for the third key in the first document.

5. The system of claim 1, wherein the first hierarchical representation is a text-based representation.

6. The system of claim 5, wherein the text-based representation is JavaScript Object Notation (JSON).

7. The system of claim 6, wherein the first hierarchical representation includes a first sibling key for the first key, wherein the timestamp for the first key is a value for the first sibling key.

8. The system of claim 7, wherein the operations comprise:
determining, by the first device, that the value for the key of the descendant element has been changed at the first device; and
in response to determining that the value for the key of the descendant element has been changed at the first device, creating, in the first document, a second sibling key for the key of the descendant element, the second sibling key including a value based on a timestamp that indicates a time at which the value for the key of the descendant element was changed and is located, in the first document, directly below the key of the descendant element.

9. The system of claim 1, wherein a value of the descendant element in the first document is included in the merged document rather than a value of the descendant element in the second document irrespective of whether the descendant element was modified at the second device at a later time than the descendant element was modified at the first device.

10. A computer-implemented method for reconciling replicas of data, the method comprising:
obtaining a first document that includes a first replica of a first hierarchical representation of an object used by an application at a first device, the first hierarchical representation of the object including a plurality of elements, each element comprising a key-value pair, the first hierarchical representation of the object including a first timestamp for a first key of a first element that indicates a time at which a first value for the first key was modified at the first device, the first element including one or more descendant elements in the first hierarchical representation;
obtaining a second document that includes a second replica of a second hierarchical representation of the object used by the application at a second device different from the first device; and
generating a merged document from the first document and the second document, the merged document including a current value of each key-value pair in the object, including:
 determining, based at least on the first timestamp for the first key, that the first value for the first key was modified at the first device at a later time than the first value for the first key was modified at the second device; and
 in response to determining that the first value for the first key was modified at the first device at a later time than the first value for the first key was modified at the second device, including, in the merged document:
  for the first key, the first value for the first key in the first document rather than the first value for the first key in the second document; and
  for each descendant element of the first element, a value for a key of the descendant element in the first document rather than a value for the key of the descendant element in the second document.

11. The method of claim 10, wherein:
the second hierarchical representation includes a second timestamp that indicates a time at which the first value for the first key was modified at the second device; and
determining, based at least on the first timestamp, that the first value for the first key was modified at the first device at a later time than the first value for the first key was modified at the second device comprises determining that the time indicated by the first timestamp is later than the time indicated by the second timestamp.

12. The method of claim 10, wherein:
the second hierarchical representation does not include a second timestamp for the first key; and
determining, based at least on the first timestamp, that the first value for the first key was modified at the first device at a later time than the first value for the first key was modified at the second device comprises determining that the first value for the first key has not been modified at the second device since a last merge of the first document with the second document.

13. The method of claim 10, wherein:
the first hierarchical representation includes:
  a second timestamp that indicates a time at which a second value for a second key of a second element of the plurality of elements was modified at the first device, the second element including a second descendant element; and
  a third timestamp that indicates a time at which a third value for a third key of the second descendant element was modified at the first device;
the second hierarchical representation includes:
  a fourth timestamp that indicates a time at which the second value for the second key was modified at the second device; and
  a fifth timestamp that indicates a time at which the third value for the third key was modified at the second device;
the operations further comprise:
  determining that the time indicated by the second timestamp matches the time indicated by the fourth timestamp and, in response:
    comparing the third timestamp to the fifth timestamp;
    determining, based on the comparing, that the third value for the third key was modified at the second device at a later time than the third value for the third key was modified at the first device; and
    in response to determining that the third value for the third key was modified at the second device at a later time than the third value for the third key was modified at the first device, including, in the merged document, the third value for the third key in the second document rather than the third value for the third key in the first document.

14. The method of claim 10, wherein the first hierarchical representation is a text-based representation.

15. The method of claim 14, wherein the text-based representation is JavaScript Object Notation (JSON).

16. The method of claim 15, wherein the first hierarchical representation includes a first sibling key for the first key, wherein the timestamp for the first key is a value for the first sibling key.

17. The method of claim 16, further comprising:
determining, by the first device, that the value for the key of the descendant element has been changed at the first device; and
in response to determining that the value for the key of the descendant element has been changed at the first device, creating, in the first document, a second sibling key for the key of the descendant element, the second sibling key including a value based on a timestamp that indicates a time at which the value for the key of the descendant element was changed and is located, in the first document, directly below the key of the descendant element.

18. The method of claim 10, wherein a value of the descendant element in the first document is included in the merged document rather than a value of the descendant element in the second document irrespective of whether the descendant element was modified at the second device at a later time than the descendant element was modified at the first device.

19. A non-transitory computer storage medium encoded with a computer program, the program comprising instructions that when executed by one or more data processing apparatus cause the data processing apparatus to perform operations comprising:
obtaining a first document that includes a first replica of a first hierarchical representation of an object used by an application at a first device, the first hierarchical representation of the object including a plurality of elements, each element comprising a key-value pair, the first hierarchical representation of the object including a first timestamp for a first key of a first element that indicates a time at which a first value for the first key was modified at the first device, the first element including one or more descendant elements in the first hierarchical representation;
obtaining a second document that includes a second replica of a second hierarchical representation of the object used by the application at a second device different from the first device; and
generating a merged document from the first document and the second document, the merged document including a current value of each key-value pair in the object, including:
  determining, based at least on the first timestamp for the first key, that the first value for the first key was modified at the first device at a later time than the first value for the first key was modified at the second device; and
  in response to determining that the first value for the first key was modified at the first device at a later time than the first value for the first key was modified at the second device, including, in the merged document:
    for the first key, the first value for the first key in the first document rather than the first value for the first key in the second document; and
    for each descendant element of the first element, a value for a key of the descendant element in the first document rather than a value for the key of the descendant element in the second document.

20. The non-transitory computer storage medium of claim 19, wherein:
the second hierarchical representation includes a second timestamp that indicates a time at which the first value for the first key was modified at the second device; and
determining, based at least on the first timestamp, that the first value for the first key was modified at the first device at a later time than the first value for the first key was modified at the second device comprises determining that the time indicated by the first timestamp is later than the time indicated by the second timestamp.

* * * * *